(12) United States Patent
Ohno et al.

(10) Patent No.: US 8,196,998 B2
(45) Date of Patent: Jun. 12, 2012

(54) VEHICLE FRONT STRUCTURE

(75) Inventors: Shinji Ohno, Shizuoka-ken (JP); Taku Sumino, Shizuoka-ken (JP); Hironori Shigemasu, Shizuoka-ken (JP); Idemitsu Masuda, Shizuoka-ken (JP); Akito Miyazaki, Shizuoka-ken (JP)

(73) Assignee: Suzuki Motor Corporation, Shizuoka-Ken (JP)

(*) Notice: Subject to any disclaimer, the term of this patent is extended or adjusted under 35 U.S.C. 154(b) by 139 days.

(21) Appl. No.: 12/726,997

(22) Filed: Mar. 18, 2010

(65) Prior Publication Data

US 2010/0244481 A1    Sep. 30, 2010

(30) Foreign Application Priority Data

Mar. 30, 2009 (JP) ................. 2009-081563

(51) Int. Cl.
   *B60R 19/26* (2006.01)
   *B60R 19/52* (2006.01)
(52) U.S. Cl. ........... 296/193.09; 296/187.09; 296/193.1; 293/133; 293/155
(58) Field of Classification Search ............ 296/187.09, 296/193.09, 193.1, 203.02; 293/102, 133, 293/155
   See application file for complete search history.

(56) References Cited

U.S. PATENT DOCUMENTS

| 6,880,882 | B2 * | 4/2005 | Andre et al. | 296/193.09 |
| 7,303,219 | B2 * | 12/2007 | Trabant et al. | 293/155 |
| 7,517,006 | B2 * | 4/2009 | Kageyama et al. | 296/187.09 |
| 7,681,700 | B2 * | 3/2010 | Ginja et al. | 188/377 |
| 7,690,703 | B2 * | 4/2010 | Maruko | 293/102 |
| 7,798,560 | B2 * | 9/2010 | Hedderly | 296/187.03 |
| 7,887,125 | B2 * | 2/2011 | Tazaki et al. | 296/193.1 |
| 7,967,350 | B2 * | 6/2011 | Ginja et al. | 293/136 |
| 8,002,072 | B2 * | 8/2011 | Schmahl | 180/274 |
| 2010/0127520 | A1 * | 5/2010 | Ginja et al. | 293/146 |
| 2010/0127533 | A1 * | 5/2010 | Gonin | 296/193.09 |
| 2010/0244487 | A1 * | 9/2010 | Gonin et al. | 296/187.09 |
| 2011/0204680 | A1 * | 8/2011 | Fortin | 296/193.1 |

FOREIGN PATENT DOCUMENTS

| JP | 10-166970 | 6/1998 |
| JP | 2000-053017 | 2/2000 |

* cited by examiner

*Primary Examiner* — Glenn Dayoan
*Assistant Examiner* — Gregory Blankenship
(74) *Attorney, Agent, or Firm* — Beem Patent Law Firm

(57) ABSTRACT

A vehicle front structure has a pair of right and left apron side members 1 each extending in the vehicle longitudinal direction and having a closed cross section structure, a bumper 2 located on the vehicle front side Fr of the front end portion of the apron side member 1, and a grille 5 attached to air intake openings 3, 4 in the bumper 2. In this vehicle front structure, shock absorbing parts 20 formed integrally with the grille 5 are disposed between the bumper 2 and the front end portions of the apron side members 1.

5 Claims, 7 Drawing Sheets

VEHICLE FRONT STRUCTURE

CROSS-REFERENCE TO RELATED APPLICATIONS

This application claims the benefit of priority from Japanese Patent Application No. 2009-081563, filed Mar. 30, 2009.

BACKGROUND OF THE INVENTION

1. Field of the Invention

The present invention relates to a vehicle front structure, having a pair of right and left apron side members each having a closed sectional structure, which extend along the vehicle longitudinal direction, a bumper located on the vehicle front side of the front end portions of the apron side members, and a grille attached to an air intake opening of the bumper.

2. Description of the Related Art

An apron side member is a member having a strength, which constitutes the skeleton of a motor vehicle. When the motor vehicle is involved in a collision, if the strength of the collision object is low, the apron side member is less liable to deform and has difficulty in absorbing the shock load. Therefore, as disclosed in JP 2000-53017 A, a square tubular shock absorbing part separate from a bumper and the apron side member has conventionally been fixedly attached to the front end portion of the apron side member so that when the motor vehicle is involved in a collision, the shock load can be absorbed even if the strength of the collision object is low.

BRIEF SUMMARY OF THE INVENTION

According to the above-described conventional structure, since the square tubular shock absorbing part separate from the bumper and the apron side member has been fixedly attached to the front end portion of the apron side member, the number of parts has been increased, so that the cost of parts to be controlled has increased. Also, the assembly labor has been increased, and much time and labor is required for assembly work.

The present invention has been made in view of the above circumstances, and accordingly, an object thereof is to provide a vehicle front structure in which the number of parts can be decreased to reduce the cost of parts to be controlled, the labor for assembly can be reduced, and assembly work can be simplified.

The present invention provides a vehicle front structure including: a pair of right and left apron side members each extending in the vehicle longitudinal direction and having a closed cross section structure; a bumper located on the front side of the front end portions of the apron side members; and a grille attached to an air intake opening in the bumper, wherein shock absorbing parts formed integrally with the grille are disposed between the bumper and the front end portions of the apron side members.

According to this configuration, since the shock absorbing parts are disposed between the bumper and the front end portions of the apron side members, even on the vehicle front side of the highly rigid apron side members, a shock load applied from the vehicle front side can be absorbed relatively softly, and damage to a collision object can be reduced.

Also, since the shock absorbing parts are formed integrally with the grille, the number of parts can be reduced, and the shock absorbing part can be manufactured easily, so that the cost of parts to be controlled and the production costs of the parts can be reduced. Moreover, since the shock absorbing parts can be assembled to the bumper by attaching the grille to the bumper, the assembly work is simplified, so that the assembly labor can be reduced.

In the present invention, it is preferable that the bumper have notch sections for mounting headlamps and that the shock absorbing parts be disposed on the back side of the design surface of the bumper at the right and left side of the air intake opening and below the notch sections.

Since the shock absorbing part is disposed on the back side of the design surface of the bumper at the side of the air intake opening and below the notch, the design surface of the bumper is arranged on the front side of the shock absorbing part, and a shock load applied from the front can be received reliably by the broad surface (the design surface) and be transmitted to the shock absorbing part. Therefore, the shock absorbing parts can function effectively.

Also, the shock absorbing part can be hidden by the design surface of the bumper disposed on the front side of the shock absorbing part, so that appearance quality can be improved, so that the sale value can be increased.

Usually, the headlamp is disposed on the vehicle rear side of the bumper tip end to avoid damage thereto. According to the above-described configuration of the present invention, since the shock absorbing part is disposed on the back side of the design surface below the notch for mounting the headlamp of the bumper, the shock absorbing part can be disposed on the back side of the bumper projecting to the front with respect to the headlamp, a shock load can be received reliably by the large area before the headlamp receives the shock load, and the shock absorbing part can function effectively, so that damage to the headlamp can be reduced.

In the present invention, it is preferable that each of the shock absorbing parts be formed as a concave portion that is concaved from a lateral end part of the grille toward the vehicle rear side, and has an opening that is open to the vehicle front side, peripheral walls extending substantially along the vehicle longitudinal direction, and a back wall connecting the rear end parts of the peripheral walls to each other, so that when a shock load is applied to the bumper from the vehicle front side, the shock absorbing part receives the shock load via the bumper and the back wall comes into contact with the front end surface of the apron side member. By this configuration, the operation described below can occur.

Since the shock absorbing part is formed in a concave shape that is concave to the vehicle rear side, the shock absorbing operation can be performed easily. Also, the shock absorbing part can be molded easily on the grille, and the grille molding tool can be configured easily. Furthermore, a shock load applied from the front can be received easily by the back wall of the concave part that comes into contact with the front end surface of the apron side member, so that the shock absorbing operation can occur more easily.

In the present invention, it is preferable that first ribs each projecting from the periphery of the opening of the shock absorbing part toward the vehicle front side be formed on the front surface of the grille; and reinforcing second ribs or reinforcing beads each extending in the vehicle longitudinal direction be formed so that when a shock load is applied to the bumper from the vehicle front side, the first ribs come into contact with the back surface of the bumper. By this configuration, the operation described below can occur.

Since the first ribs each projecting from the periphery of the opening of the shock absorbing part toward the vehicle front side are formed on the front surface of the grille, when a shock load is applied to the bumper from the vehicle front side, the shock absorbing part can perform the shock absorbing function at an early stage due to the first rib.

Also, in a structure in which a clip engaging with the front end surface of the apron side member is attached to the back wall of the shock absorbing part, by pressing the bumper to the vehicle rear side, the pressing force can be transmitted to the body part of the shock absorbing part via the first rib, whereby the clip can be engaged with the front end surface of the apron side member, so that assembly can be facilitated.

Also, by the second rib or the bead, the shock load absorbing performance of the shock absorbing part can be changed or adjusted, so that desired absorbing performance can be achieved easily.

Furthermore, since the second rib or the bead is formed substantially along the vehicle longitudinal direction, the molding tool can be configured easily, so that the productivity can be improved.

In the present invention, if each of the second ribs is extended between the inner surfaces of the opposed peripheral walls, and is formed in a lattice form, the rigidity of the shock absorbing parts can be improved, so that a high shock load can be absorbed.

In the present invention, it is preferable that each of the apron side members have an upright rectangular cross section; each of the shock absorbing parts be formed in an upright rectangular cross section corresponding to each of the apron side members; each length in the vehicle longitudinal direction of the peripheral walls be longer than each length in the vehicle width direction of the peripheral walls; and each of the back walls of the shock absorbing parts be disposed adjacent to the front end surface of the apron side member. In this case, the shock absorbing parts can be made sufficiently large, so that a high shock load can be absorbed easily.

As described above, according to the present invention, there can be provided the vehicle front structure, such that the number of parts can be decreased to reduce the cost of parts to be controlled, the labor for assembly can be reduced, and the assembly work can be simplified.

DETAILED DESCRIPTION OF THE INVENTION

A best mode for carrying out the present invention will now be described with reference to the accompanying drawings.

Figure 1:
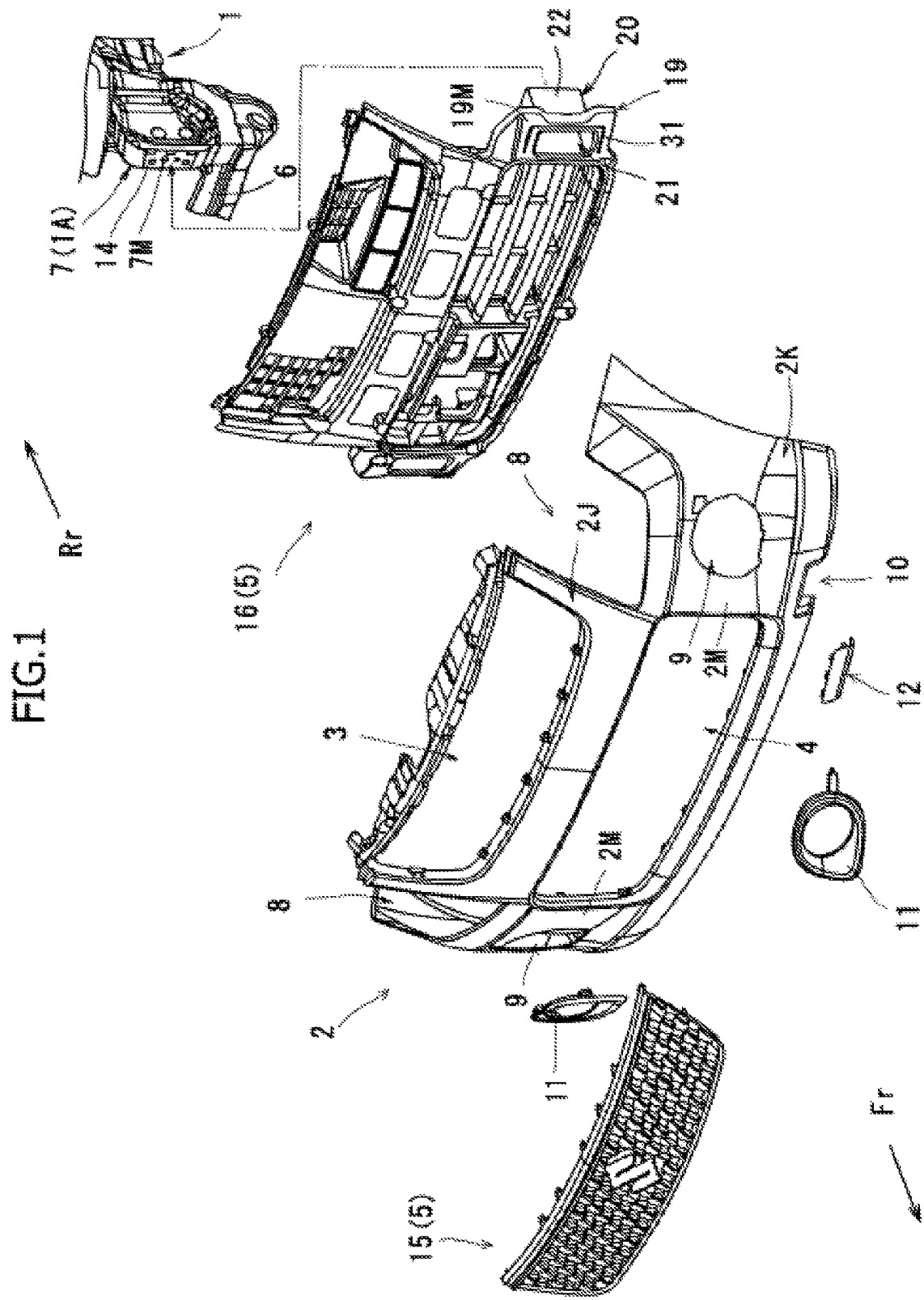
FIG. 1 is an exploded perspective view of a vehicle front.

FIG. 1 is an exploded perspective view of a vehicle front. This vehicle front structure has a pair of right and left apron side members 1, each having a closed section structure, provided along the vehicle longitudinal direction, a bumper 2 located on the vehicle front side Fr of front end portions 1A of the apron side members 1, and a grille 5 attached to a pair of upper and lower air intake openings 3 and 4 of the bumper 2.

Structure of Apron Side Member 1

The apron side member 1 is formed in a rectangular shape having a longitudinally long cross section, and receives a shock load to suppress the deformation of vehicle body when a shock load is applied from the vehicle front side Fr. The front end portion 1A of the apron side member is configured as a plane perpendicular to the vehicle longitudinal direction by a gusset 7 of a rectangular shape having a longitudinally long cross section, which gusset 7 rises from the end part of a radiator support lower member 6 extending in the transverse direction. The rear end of the gusset 7 is connected to the front end of an apron side member body part extending along the vehicle longitudinal direction. To the side wall of the gusset 7 on the center side in the vehicle transverse direction, the lower end part of a lamp support brace (not shown) extending in the up and down direction is connected.

Structure of Bumper 2

The air intake opening 4 on the lower side of the bumper 2 is formed in a transversely long rectangular shape in a lower half part 2K of the bumper 2, and the upper air intake opening 3 is formed in an upper half part 2J of the bumper so as to be shorter in the transverse direction than the lower air intake opening 4. Both of the right and left end parts of the lower half part 2K of the bumper 2 are bent to the vehicle rear side Rr, and the upper half part 2J of the bumper 2 is bent and tilted so that the upper side thereof is located on the vehicle rear side Rr with respect to the lower half part 2K.

The upper half part 2J of the bumper 2 has notch sections 8 for mounting a pair of right and left headlamps located by holding the upper air intake opening 3 therebetween. The lower half part 2K of the bumper 2 has a pair of right and left fog lamp mounting holes 9 located below the notch sections 8 for mounting the headlamps and notch sections 10 for receiving a pair of right and left traction hooks, which is located below the fog lamp mounting holes 9.

The notch 8 for mounting the headlamp is open to the upper side, and the lower end of the notch 8 is located so as to be lower than the lower end of the upper air intake opening 3. The notch 10 for receiving the traction hook is open to the lower side. To the fog lamp mounting hole 9, a bezel 11 is attached, and to the notch 10 for receiving the traction hook, a cap 12 is attached.

Structure of Grille 5

The grille 5 consists of a front grille 15 attached to the upper air intake opening 3 from the vehicle front side Fr and a rear grille 16 attached to the pair of upper and lower air intake openings 3 and 4 from the vehicle rear side Rr, and these front and rear grilles 15 and 16 are mounted to the bumper 2 with screws.

As shown in FIGS. 1 to 4, between the bumper 2 and a front wall 14 of the gusset 7 of the apron side member 1, shock absorbing parts 20 formed integrally with the rear grill 16 are disposed. The shock absorbing parts 20 are formed in the lower half part in a state of projecting to the right and left outsides from both of the right and left end parts of the lower half part of the rear grille 16 so as to absorb a shock load applied from the vehicle front side Fr when the motor vehicle is involved in a collision.

Structure of Shock Absorbing Part 20 of Grille 5

The shock absorbing part 20 is disposed on the back side of a design surface 2M of the bumper 2 at the side of the lower air intake opening 4 and below the notch 8 for mounting the headlamp. Specifically, the shock absorbing part 20 is disposed on the back side of the bumper design surface 2M in the range surrounded by the lower outside air intruding opening 4, the fog lamp mounting hole 9 at the side of the lower outside air intruding opening 4 (the right and left outside of vehicle), and the headlamp mounting notch 8 above the fog lamp mounting hole 9.

That is, the shock absorbing part 20 is disposed in a space in which the fog lamp and the like are absent. Thereby, the shock absorbing part 20 can be relatively increased in size, and therefore can perform a shock force absorbing function easily and effectively. The design surface 2M of the bumper 2 and a back surface 2U on the back side of the design surface 2M are formed in an arcuate shape (a gentle arcuate shape) in cross section so as to be convex to the vehicle front side Fr (refer to FIG. 3).

Furthermore, the shock absorbing part 20 is formed in a state of being concave from a front end surface 19M of an end part 19 in the transverse direction of the rear grille 16 to the vehicle rear side Rr, and has an opening 21 that is open to the vehicle front side Fr, peripheral walls 22 extending substantially along the vehicle longitudinal direction, and a back wall 23 connecting the end parts on the vehicle rear side Rr of the peripheral walls 22 to each other.

Also, the shock absorbing part 20 is formed in a rectangular shape having a longitudinally long cross section slightly smaller than the longitudinal cross sectional shape of the gusset 7 so as to correspond to the apron side member 1. The length in the vehicle longitudinal direction of the peripheral wall 22 is set longer than the length in the vehicle width direction of the peripheral wall 22, and the back wall 23 of the shock absorbing part 20 faces to a front end surface 7M of a front wall 14 of the gusset 7 of the apron side member 1.

That is, the shock absorbing part 20 is formed so as to expand from the front end surface 19M arranged close to the back surface 2U of the bumper 2 toward the front part 1A (the front end surface 7M) of the apron side member 1, and the back wall 23 of the shock absorbing part 20 is disposed close to the front part 1A (the front end surface 7M) of the apron side member 1.

The back wall 23 is set so that the wall thickness thereof is larger than that of the front wall 14 of the gusset 7. Furthermore, the central part of the back wall 23 is configured into an attachment part 24 of a rectangular shape as viewed toward the vehicle front, which is thicker than the portion around the central part of the back wall 23 and the peripheral wall 22. A taper-shaped positioning pin 25 projects from the attachment part 24 toward the vehicle rear side Rr, and a clip hole 26 is penetratingly formed below the positioning pin 25 of the attachment part 24.

A clip 28 is attached to the clip hole 26, the positioning pin 25 is inserted through a pin hole 29 in the gusset 7 from the vehicle front side Fr, and the clip 28 is insertedly engaged with a clip hole 27 formed in the front wall 14 of the gusset 7, whereby the attachment part 24 is attached to the front wall 14. Between the attachment part 24 and the front wall 14 of the gusset 7, a clearance S is formed, so that when a shock load is applied to the bumper 2 from the vehicle front side Fr, the shock absorbing part 20 receives the shock load via the bumper 2, and the back wall 23 comes into contact with the front end surface 7M of the front wall 14 of the gusset 7.

According to the above-described configuration, since the positioning pin 25 is inserted through the pin hole 29 in the gusset 7, and the clip 28 is insertedly engaged with the clip hole 26 in the attachment part 24 and the clip hole 27 formed in the front wall 14 of the gusset 7, when a shock load is applied from the front, the shock absorbing part 20 can receive the shock load easily without shifting of the position thereof. Therefore, the shock absorbing part 20 can perform the shock load absorbing function more reliably.

On the front end surface 19M of the end part 19 of the rear grille 16, a U-shaped first rib 31 is formed so as to project from the periphery of the opening 21 of the shock absorbing part 20 toward the vehicle front side Fr as viewed from the vehicle front side Fr. A longitudinal rib part 31A of the first rib 31 is located on the outside at the right or the left of the opening 21 in the shock absorbing part 20 (the outside at the right or the left of the vehicle). Also, a pair of upper and lower transverse rib parts 31b of the first rib 31 are located on the upper side and the lower side, respectively, of the opening 21 in the shock absorbing part 20, and the end parts of the transverse rib parts 31B on the center side in the transverse direction of the vehicle are located at almost the same position as that of a side part 21S of the opening 21 on the center side in the transverse direction of the vehicle.

Figure 3:
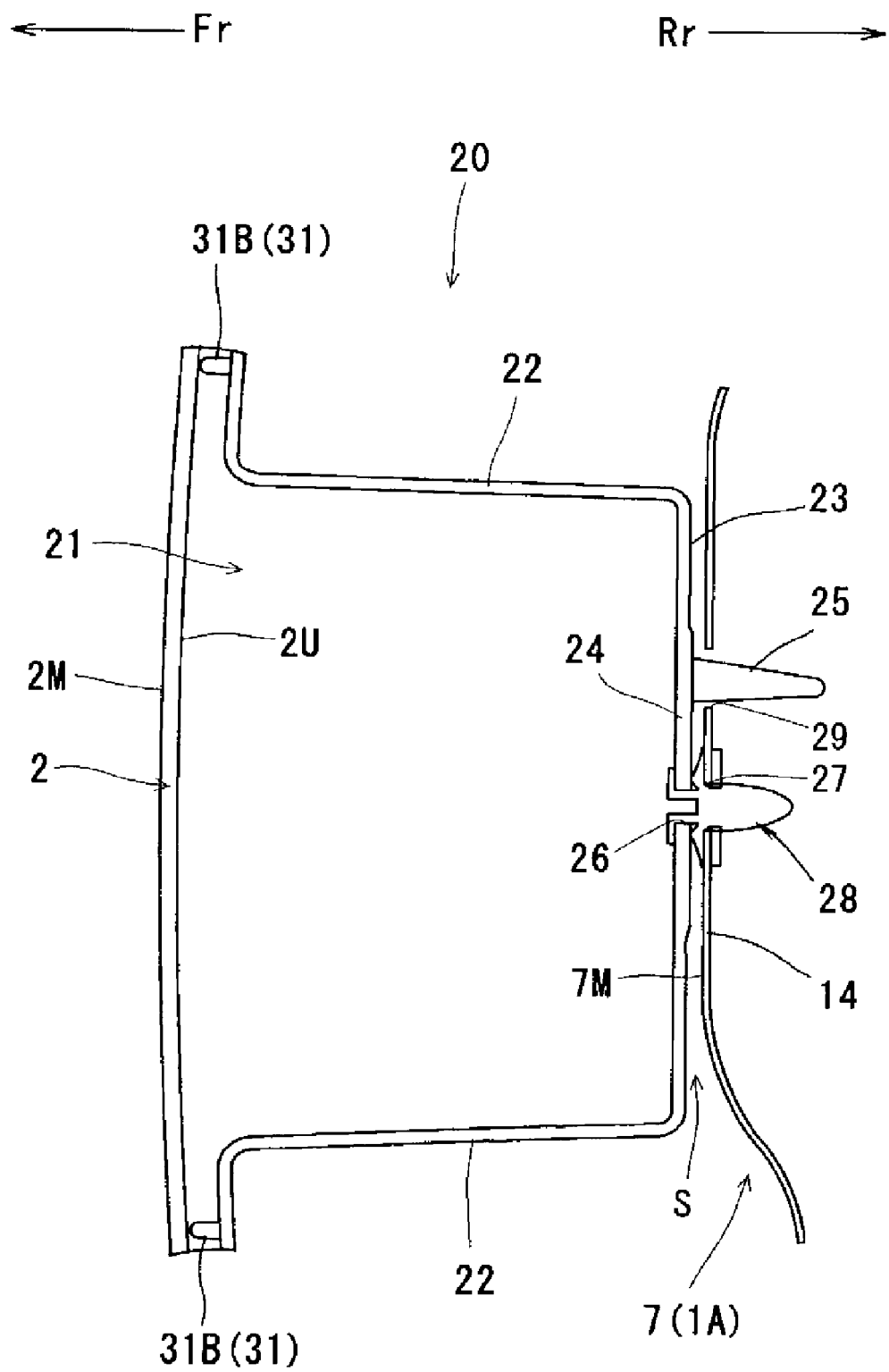
FIG. 3 is a sectional view taken along the line A-A of FIG. 2, including a sectional view of a bumper and a gusset.
Figure 4:
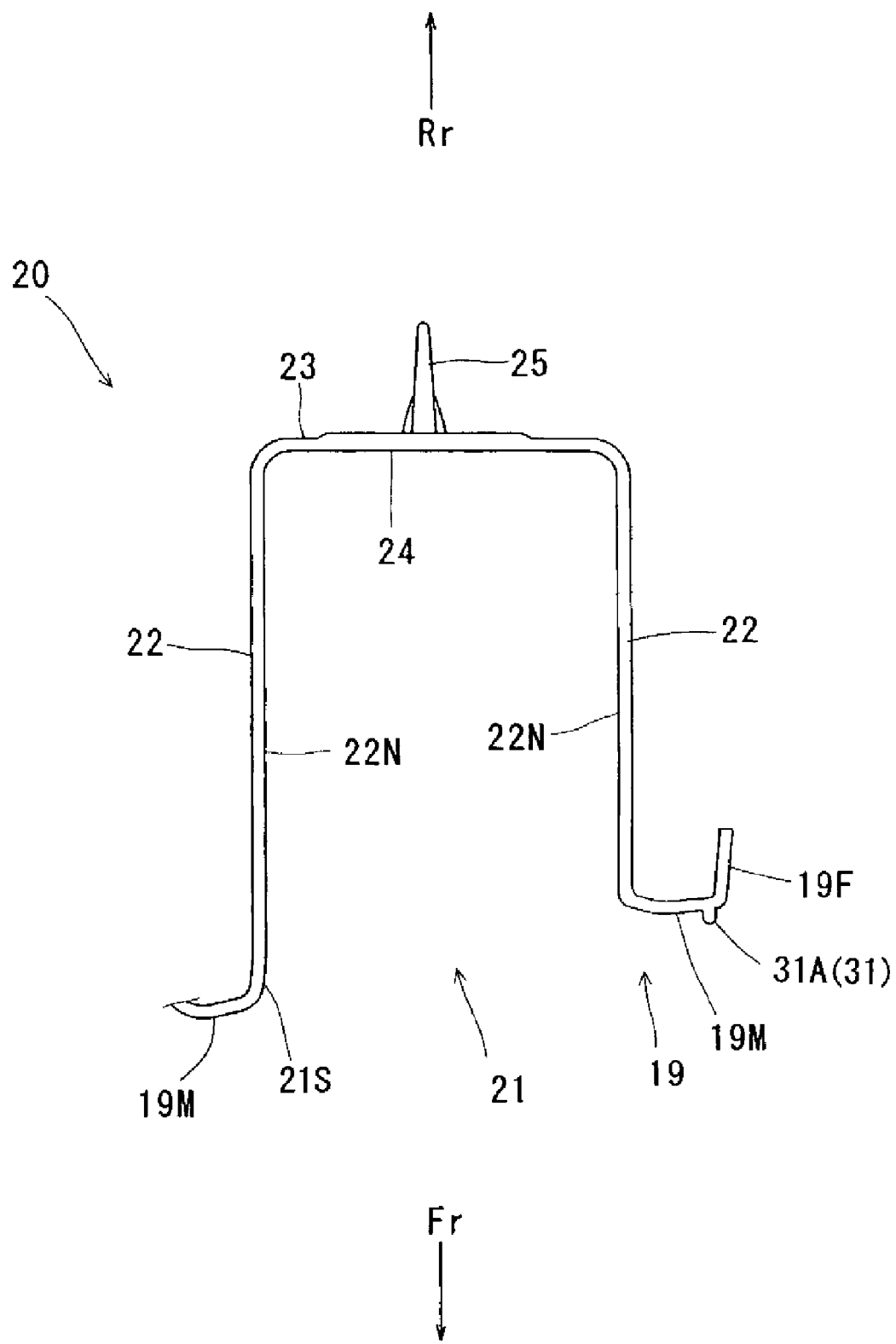
FIG. 4 is a sectional view taken along the line B-B of FIG. 2.

As shown in FIG. 3, the top part of the first rib 31 is formed in an arcuate shape in cross section, and is located close to the back surface 2U on the back side of the design surface 2M of the bumper 2 so that when a shock load is applied to the bumper 2 from the vehicle front side Fr, the first rib 31 comes into contact with the back surface 2U of the bumper 2. The wall thickness of the first rib 31 (the thickness of the first rib 31 in the direction perpendicular to the projecting direction) is set to be greater than the thickness of the peripheral wall 22 of the shock absorbing part 20, and is set approximately equal to the thickness of the attachment part 24 of the back wall 23. By the first rib 31, a structure for transmitting a shock load to the shock absorbing part 20 disposed closer to the back surface 2U of the bumper 2 can be configured easily, and the shock load applied from the front is transmitted to the shock absorbing part 20 rapidly and reliably, so that the shock load absorbing function can be satisfied.

Figure 2:
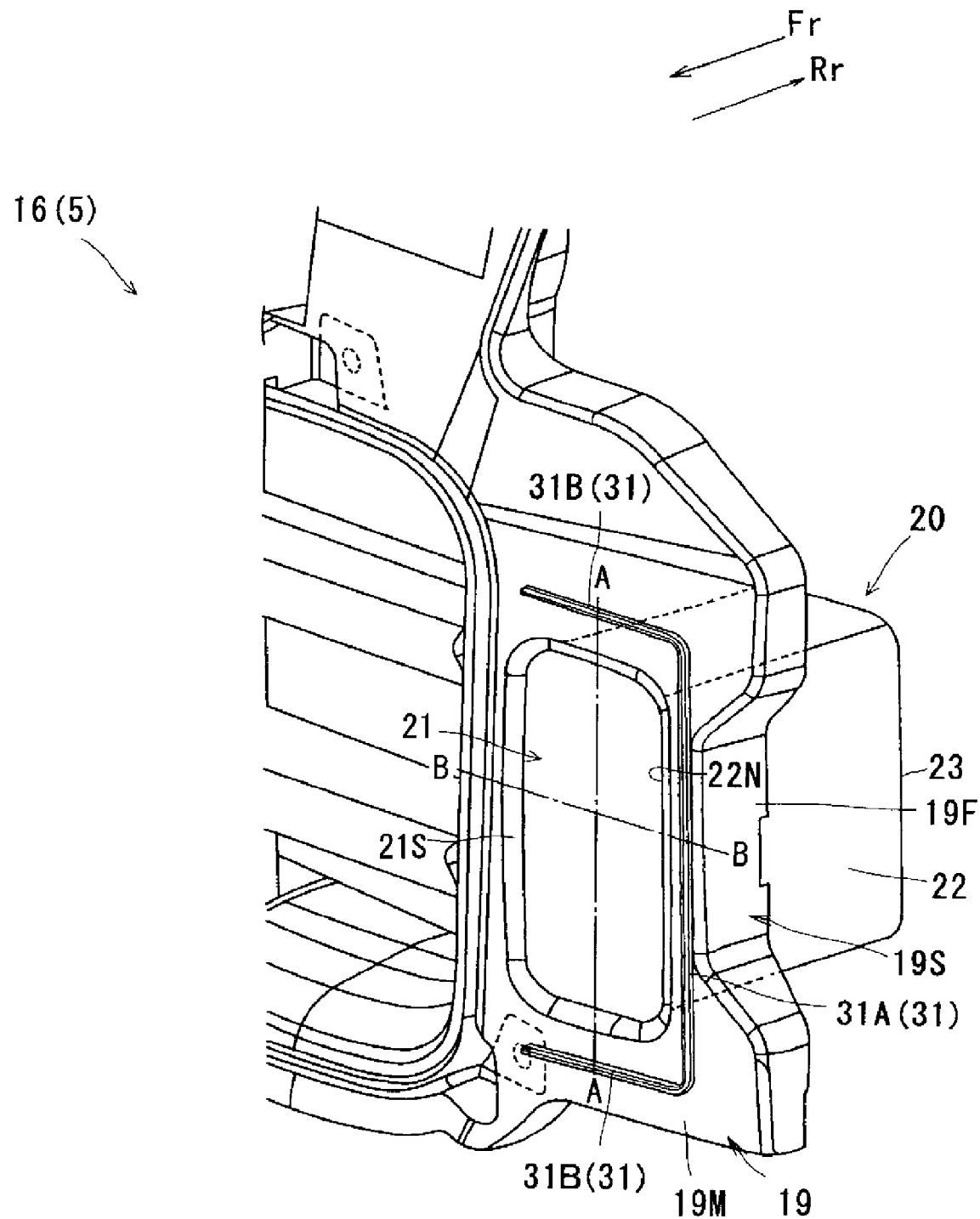
FIG. 2 is a perspective view of a shock absorbing part.

As shown in FIG. 2, a flange 19F is formed in the peripheral part of the end part 19 of the rear grille 16. The flange 19F is located above, below, and on the right or left lateral end part (at the side) of the shock absorbing part 20, and projected to the vehicle rear side Rr. Also, a side part 19S of the end part 19 of the rear grille 16, located on the right or left outside (at the side) of the shock absorbing part 20 is concave to the shock absorbing part 20 side more than the parts above and below the side part 19S. By the above-described shape, the rigidity of the end part 19 (the front end surface 19M) of the rear grille 16, which serves as the front end portion of the shock absorbing part 20 and receives the shock load applied from the front is improved, so that the shock load absorbing function can be reliably satisfied.

Figure 5:
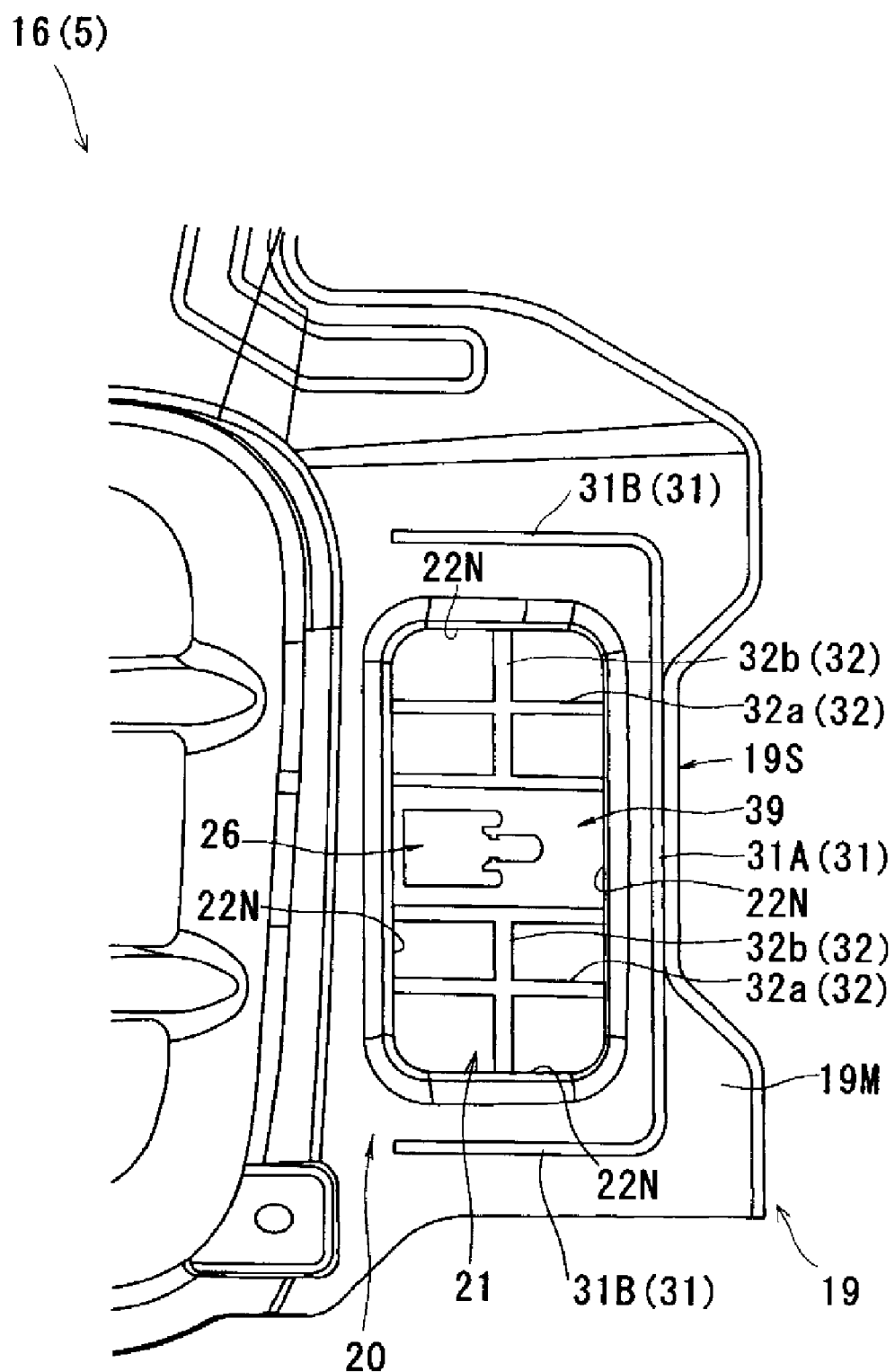
FIG. 5 is a front view of a shock absorbing part of another embodiment (1)
Figure 6:
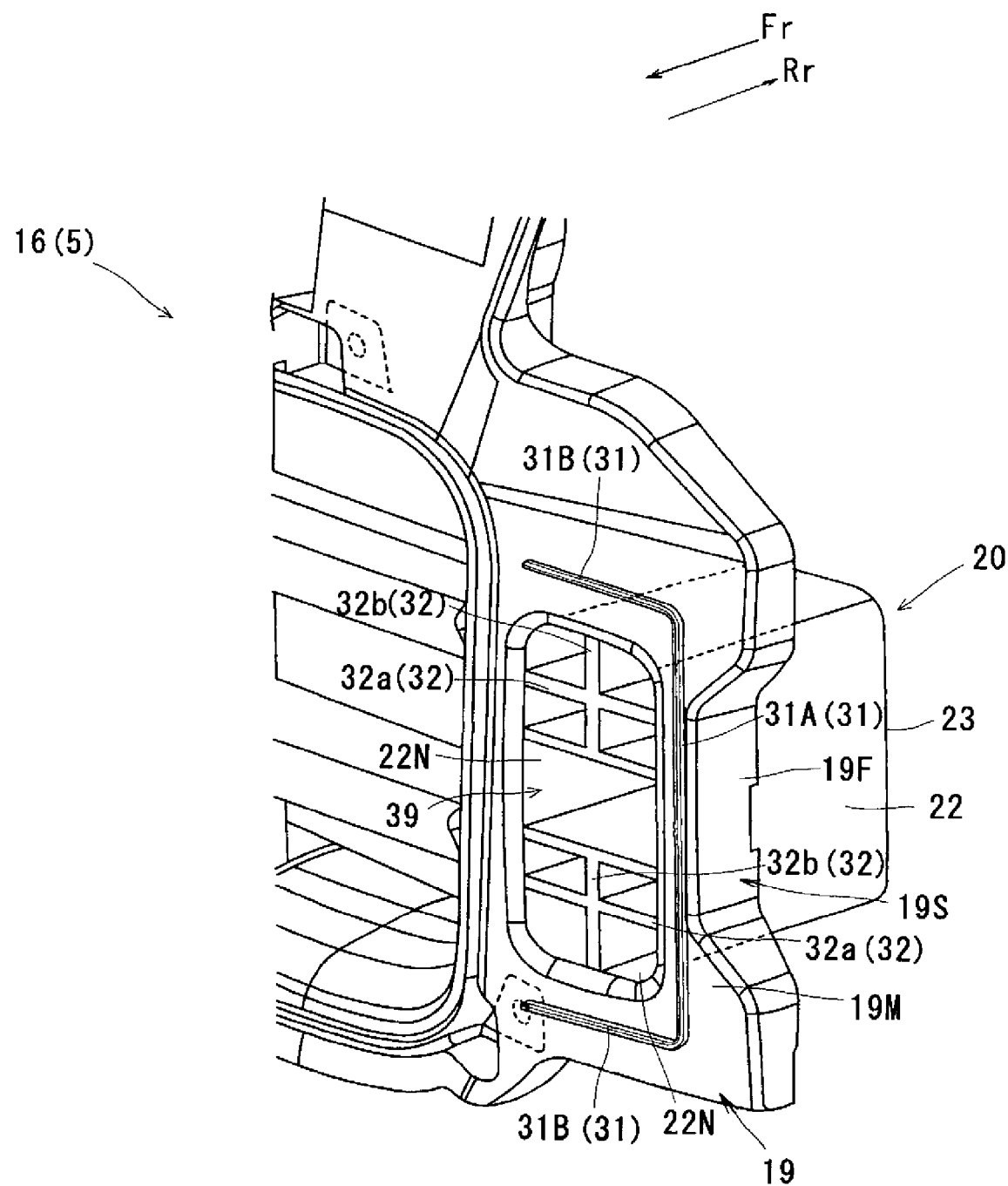
FIG. 6 is a perspective view of a shock absorbing part of another embodiment (1)

Other Embodiments (1) As shown in FIGS. 5 and 6, a reinforcing second rib 32 extending in the vehicle longitudinal direction may be formed on the peripheral wall 22 of the shock absorbing part 20. This second rib 32 is provided between inner surfaces 22N of the opposed peripheral walls and is formed in a lattice form, and consists of upper and lower rib groups located on the upper side and the lower side of a clip attaching work space 39 in the central part in the up and down direction.

Each of the rib groups consists of transverse ribs 32a provided between the inner surfaces 22N of the pair of right and left peripheral walls 22, and a longitudinal rib 32b that intersects the transverse ribs 32a and connecting with the inner wall 22N of the upper peripheral wall 22 or the inner wall 22N of the lower peripheral wall 22. The transverse ribs 32a and the longitudinal rib 32b are formed ranging from the front end of the shock absorbing part 20 to the rear end thereof, and the rear end parts of the ribs 32a and 32b connect with the back wall 23. By this structure, the rigidity of the shock absorbing part 20 can be improved, so that a high shock load can be absorbed.

Figure 7:
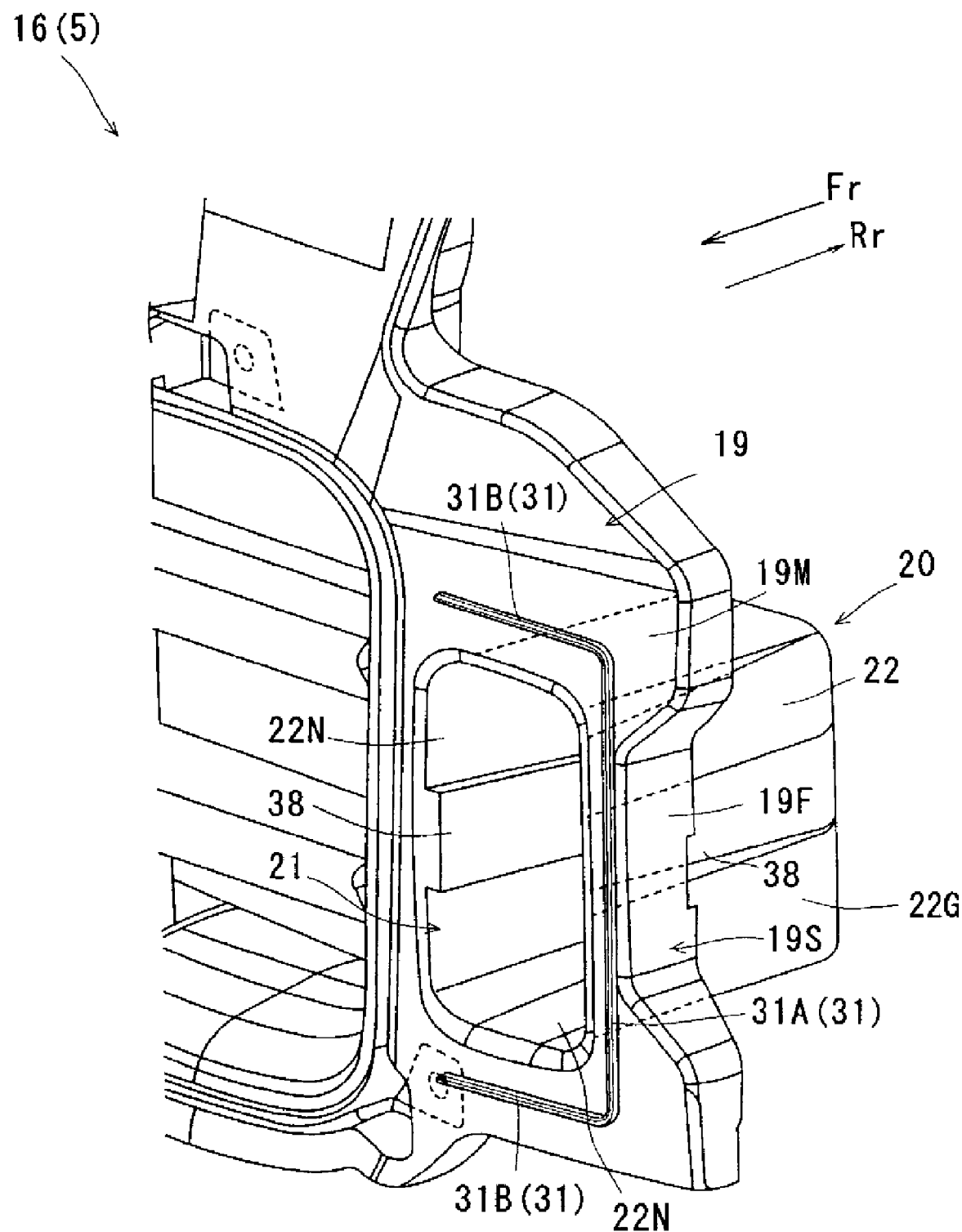
FIG. 7 is a perspective view of a shock absorbing part of another embodiment (2).

(2) As shown in FIG. 7, in place of the second rib 32, a reinforcing bead 38 extending in the vehicle longitudinal direction may be formed on the peripheral wall 22 of the shock absorbing part 20. The bead 38 is formed in an elevation projecting from the inner surfaces 22N of a pair of right and left longitudinal walls of the peripheral walls 22, and is formed ranging from the front end of the shock absorbing part 20 to the rear end thereof. The bead 38 is located in central portion in the up and down direction of the longitudinal wall, and the length in the up and down direction of the bead 38 is set at about one-third of the longitudinal wall. Also, the bead 38 is formed so that the projection amount thereof decreases toward the vehicle rear side Rr.

(3) In addition to the structure of embodiment (2), the bead 38 may be formed on the inner surfaces 22N of the transverse walls of the peripheral walls 22. Also, the bead 38 may be formed on the inner surfaces 22N of the transverse walls only of the peripheral walls 22.

(4) The second rib 32 or the bead 38 may be formed on outer surfaces 22G of the peripheral surfaces 22.

(5) In the above-described embodiments, the shock absorbing part 20 is formed in a single concave shape that is concave from the front end surface 19M of the end part 19 in the transverse direction of the rear grille 16 to the vehicle rear side Rr. However, the shock absorbing part 20 may be formed in a plurality of concave shapes that are concave from the front end surface 19M of the end part 19 in the transverse direction of the rear grille 16 to the vehicle rear side Rr.

What is claimed is:

1. A vehicle front structure comprising:
a pair of right and left apron side members, each extending in the vehicle longitudinal direction and having a closed cross section structure;
a bumper located on the front side of the front end portions of the apron side members; and
a grille attached to an air intake opening in the bumper, wherein shock absorbing parts formed integrally with the grille are disposed between the bumper and the front end portions of the apron side members, wherein each of the shock absorbing parts is formed as a concave portion that is concave from a lateral end part of the grille toward the vehicle rear side, and has an opening that is open to the vehicle front side, peripheral walls extending substantially along the vehicle longitudinal direction, and a back wall connecting the rear end parts of the peripheral walls to each other, so that when a shock load is applied to the bumper from the vehicle front side, the shock absorbing part receives the shock load via the bumper and the back wall comes into contact with the front end surface of the apron side member.

2. The vehicle front structure according to claim 1, wherein the bumper has notch sections for mounting headlamps; and the shock absorbing parts are disposed on the back side of the design surface of the bumper at the right and left side of the air intake opening and below the notch sections.

3. The vehicle front structure according to claim 1, wherein first ribs each projecting from the periphery of the opening of the shock absorbing part toward the vehicle front side are formed on the front surface of the grille; and reinforcing second ribs or reinforcing beads each extending in the vehicle longitudinal direction are formed so that when a shock load is applied to the bumper from the vehicle front side, the first ribs come into contact with the back surface of the bumper.

4. The vehicle front structure according to claim 3, wherein each of the second ribs is extended between the inner surfaces of the opposed peripheral walls, and is formed in a lattice form.

5. The vehicle front structure according to claim 1, wherein each of the apron side members has an upright rectangular cross section; each of the shock absorbing parts is formed in an upright rectangular cross section corresponding to each of the apron side members; each length in the vehicle longitudinal direction of the peripheral walls is longer than each length in the vehicle width direction of the peripheral walls; and each of the back walls of the shock absorbing parts is disposed adjacent to the front end surface of the apron side member.

* * * * *